March 29, 1960 L. L. LAKATOS 2,930,891

RECEIVING SYSTEM FOR SUPPRESSED OR REDUCED CARRIER WAVES WITH PHASED-LOCKED SYNCHRONOUS DETECTOR

Filed Nov. 21, 1958

INVENTOR.
LOUIS L. LAKATOS
BY
Charles H. Brown
ATTORNEY

United States Patent Office 2,930,891 Patented Mar. 29, 1960

2,930,891

RECEIVING SYSTEM FOR SUPPRESSED OR REDUCED CARRIER WAVES WITH PHASE-LOCKED SYNCHRONOUS DETECTOR

Louis L. Lakatos, Philadelphia, Pa., assignor to Radio Corporation of America, a corporation of Delaware Application November 21, 1958, Serial No. 775,519

16 Claims. (Cl. 250—20)

The invention relates to a receiving system. The invention particularly relates to an amplitude modulated, double sideband suppressed carrier receiving system.

It is an object of the invention to provide an improved system for receiving radio frequency signals characterized by amplitude modulated double sideband signals and a suppressed carrier.

Another object is to provide a novel double sideband suppressed carrier receiving system in which the frequency and phase of the carrier supplied at the receiver are determined directly from the received sideband signals.

A further object is to provide a novel double sideband suppressed carrier receiving system in which a carrier having correct frequency and phase position is produced from the sidebands at the receiver by first demodulating the sidebands against the locally generated carrier and then comparing the phase of the two demodulated sidebands to produce a control signal for determining the frequency and phase of the carrier.

Briefly, the receiving system in accordance with one embodiment of the invention comprises means for separating the two sidebands in a received amplitude modulated double sideband radio frequency signal into upper sideband signals and lower sideband signals. The two separated sideband signals are demodulated against a carrier frequency signal supplied by a local oscillator. A phase comparator having first and second input circuits coupled to the demodulating means compares the relative phases of the demodulated upper and lower sideband signals and produces a control signal at an output circuit in accordance with these relative phases. The local oscillator includes a frequency determining circuit that is coupled to the output circuit of the phase comparator and that is adapted to be controlled by the control signal. The oscillator produces a carrier signal at an output circuit, the frequency and phase of the carrier signal being determined by the control signal. An output demodulator is provided. The received double sideband radio frequency signal and the carrier signal are applied to the output demodulator which operates to produce an audio frequency output signal in response thereto.

The invention is explained in detail in connection with the accompanying drawing, in which.

Figure 1:
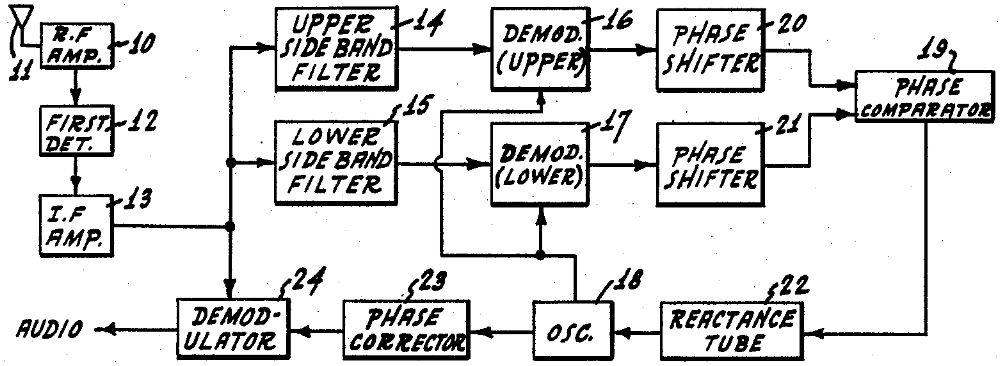
Figure 1 shows a radio receiver in block diagram form in accordance with one embodiment of the invention.

The radio receiver in accordance with the invention is intended to receive radio frequency signals characterized by amplitude modulated upper and lower sideband signals, and a suppressed carrier. Such signals are generally called suppressed carrier double sideband signals and have the advantage over the ordinary amplitude modulated double sideband signals in which the carrier is present in that the power normally present in the carrier need not be transmitted, thus providing a more economical communication system. While the invention is designed for use in systems in which the carrier is completely or substantially suppressed, the invention can be adapted for use in systems in which the carrier is present. In accordance with the invention, the receiver to be described in connection with Figure 1 provides a locally generated carrier to compensate for the absence of the carrier in the received signal. The correct frequency and phase of the carrier is maintained by means of the received sideband signals. It is known that in amplitude modulation systems, the sidebands occur in pairs, the frequencies of each pair being positioned equally or symmetrically above and below the carrier frequency. For simplicity, it will be assumed that the carrier is being modulated by a single sinusoidal tone of frequency $f_m$. If the following notations are assumed:

$f_u$=upper sideband frequency
$f_l$=lower sideband frequency
$f_c$=carrier frequency
$f_m$=modulating frequency then the following relations are true:

$$f_u=f_c+f_m \quad (1)$$

$$f_l=f_c-f_m \quad (2)$$

If $f_m$ is eliminated and $f_c$ is solved for, we get:

$$f_c=\frac{f_u+f_l}{2} \quad (3)$$

Thus, the frequency of the carrier is exactly the mean frequency of the upper and lower sideband frequencies.

It is also true that the phases of the two sidebands in amplitude modulation systems are symmetrical above and below the carrier. The relations for both frequency and phase on the basis of one modulating frequency may be obtained as follows:

Unit amplitude carrier $=\cos(\omega_c t+\phi_c)$

Cosine modulating wave $=E_m\cos(\omega_m t+\phi_m)$

Resultant modulated wave $$=\cos(\omega_c t+\phi_c)[1+E_m\cos(\omega_m t+\phi_m)]$$

$$=\cos(\omega_c t+\phi_c)+\frac{E_m}{2}\cos[(\omega_c+\omega_m)t+\phi_c+\phi_m]$$

$$+\frac{E_m}{2}\cos[(\omega_c-\omega_m)t+\phi_c-\phi_m] \quad (4)$$

In this relation, $t$ is time, $E_m$ is the amplitude of the modulating wave, $\omega_c$ and $\omega_m$ are the angular frequencies of the carrier and the modulating wave, and $\phi_c$ and $\phi_m$ are the arbitrary phase angles assigned to the unmodulated carrier and modulating wave. The three terms in Equation 4 represent the carrier, the upper sideband and the lower sideband.

The quantities in the brackets for the sidebands can be written:

$$\text{Upper sideband: } 2\pi t(f_c+f_m)+\phi_c+\phi_m \quad (5)$$
$$\text{Lower sideband: } 2\pi t(f_c-f_m)+\phi_c-\phi_m$$

From this, it is evident that at all times, the frequencies as well as the phases of the sidebands are located symmetrically above and below the carrier. For any arbitrary phase of the carrier, $\phi_c$, the upper sideband phase leads by $\phi_m$, and the lower sideband phase lags by $\phi_m$. Therefore, as in the case of the frequencies, the carrier phase is the mean of the two sideband phases. This can be expressed as follows:

$$\phi_c=\frac{(\phi_c+\phi_m)+(\phi_c-\phi_m)}{2} \quad (6)$$

Consequently, the carrier frequency and phase are uniquely determined by the frequencies and phases of the sidebands, and are derivable from the sidebands.

The mathematical expressions given above were based on one modulating frequency. However, these expressions are also true for any number of modulating frequencies. When more than one modulating frequency is present, the vector sum of all the upper sideband components produces an upper sideband resultant vector. This upper sideband resultant vector and a similar lower sideband resultant vector are symmetrically placed above and below the carrier vector in instantaneous frequency and phase relationship. Thus, the carrier may be derived from the sidebands. Again with reference to Equation 4, it is evident that the original phase angle $\phi_m$ of the modulating wave has been transferred in the process of modulation to the sideband signals as lead and lag angles with respect to the carrier signal. Conversely in demodulation, the phase of the recovered modulation frequency $f_m$ corresponds to the phase lead and lag of the sidebands with reference to the carrier. The demodulated wave also carries the required phase information. Where the carrier is suppressed and absent, it may be reproduced by demodulating the two sideband signals individually by means of a locally generated carrier, this locally generated carrier having a frequency and phase which are controlled by comprison of the two demodulated sideband signals which are present.

The receiver shown in block diagram form in Figure 1 comprises a conventional radio frequency amplifier 10 to which an antenna 11 is usually connected. In communication receivers, it is generally desirable to heterodyne the incoming radio frequency in a conventional first detector 12, after which the signals are amplified in a conventional intermediate frequency amplifier 13. The amplified intermediate frequency signals are then applied to frequency selective means, such as an upper sideband filter 14 and a lower sideband filter 15 as shown. These filters may be any of the presently used filters such as electrical networks or mechanical filters. The filters are designed so that they pass only the frequencies in the upper and lower sidebands respectively, and reject all other frequencies.

The upper and lower sideband signals are individually applied to demodulators 16, 17 to which a carrier signal is also applied from an oscillator 18. The demodulators 16, 17 may be arranged as synchronous detectors or may include other known demodulating circuits. The demodulated sideband signals are applied to a phase comparator 19, an example of which will be described in connection with Figure 2. The phase comparator 19 is designed so that it compares the phase of the demodulated upper sideband signals and the phase of the demodulated lower sideband signals and produces a control signal that has a magnitude and a polarity indicative of the relative phases. The phase comparator 19 to be described in connection with Figure 2 requires that the relative phases vary from a normal phase difference of 90°, hence phase shifters 20, 21 are provided betwen the demodulators 16, 17 and the phase comparator 19. These phase shifters are designed to normally produce a relative phase shift of 90° between the demodulated upper sideband signals and the demodulated lower sideband signals. For example, a phase shift of plus 45° may be provided by one phase shifter, and a phase shift of minus 45° may be provided by the other phase shifter. Or, a phase shift of zero degrees may be provided by one phase shifter, and a phase shift of plus or minus 90° may be provided by the other phase shifter. The control voltage developed by the phase comparator 19 is applied to the frequency determining circuit of the oscillator 18. This frequency determining circuit may be a variable reactance tube 22. The reactance tube 22 is arranged in the oscillator circuit so that it varies the frequency of the oscillator 18 in accordance with the control signal.

The oscillator 18 is designed to have a frequency equal to the mean frequency of the upper and lower sideband signals at the point of demodulation in the receiver. Thus, the oscillator 18 supplies the carrier frequency back to the sideband signals at the proper frequency and phase for demodulation. If the signals are to be demodulated at the intermediate frequency, as shown in Figure 1, then the oscillator 18 is set at a frequency corresponding to the intermediate frequency. The oscillator frequency varies from the set frequency in accordance with the control signal, which in turn varies in accordance with a change in the relative phases of the upper and lower sideband signals. The oscillator frequency varies in response to the control signal such that an exact and substantially fixed phase and frequency relationship is maintained at all times between the two sidebands and the locally generated carrier or oscillator frequency. The carrier supplied by the oscillator 18 is passed through a phase corrector 23, if needed to compensate for shift introduced by the filters 14 and 15, and then applied to a demodulator 24. The upper and lower sideband signals at the intermediate frequency are also applied from the amplifier 13 to the demodulator 24, and are demodulated down to audio frequency signals.

Figures 2, 3:
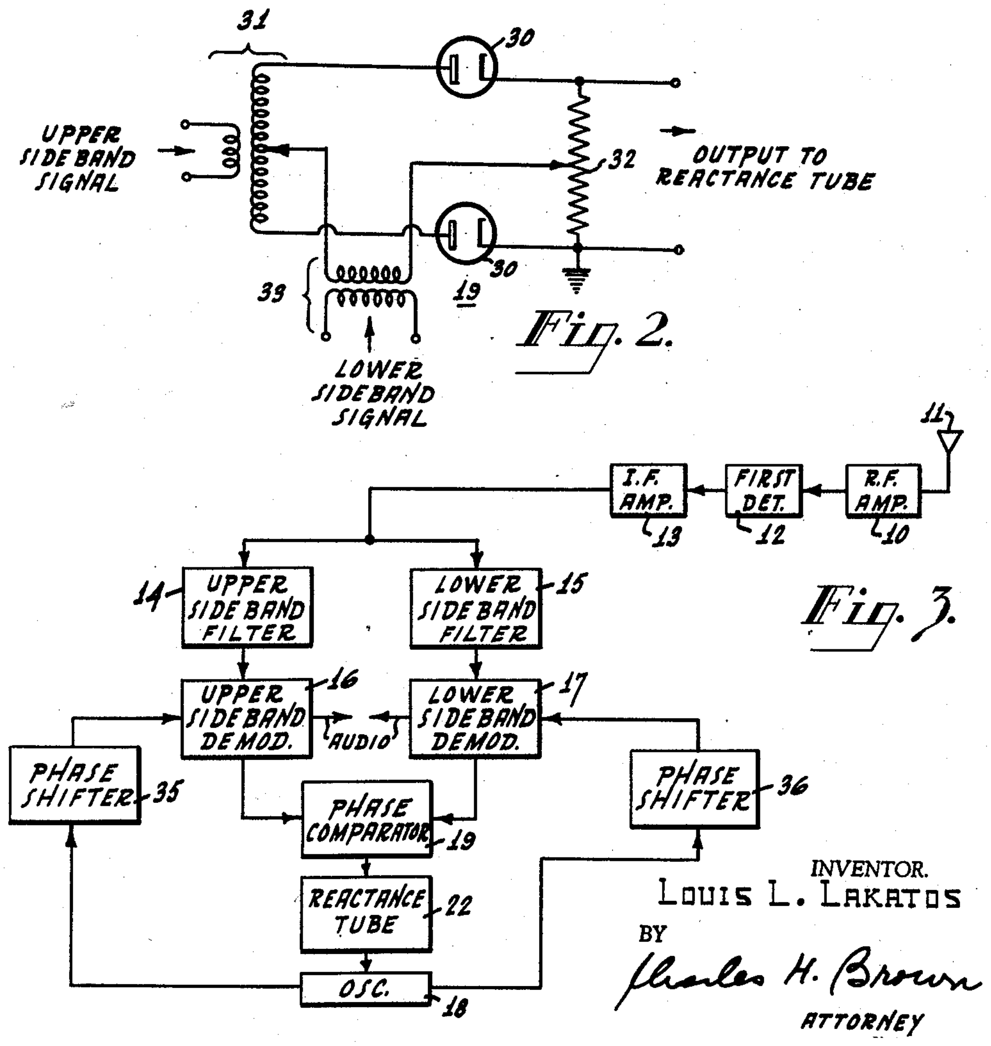
Figure 2 shows a schematic diagram of one portion of the receiver shown in Figure 1.
Figure 3 shows a radio receiver in block diagram form in accordance with another embodiment of the invention.

As previously mentioned, the phase comparator shown in block diagram form in Figure 1 may have the schematic diagram shown in Figure 2. As also previously mentioned, the phase comparator shown in Figure 2 operates on a normal phase difference of 90°. The phase comparator in Figure 2 comprises a pair of diodes or rectifier devices 30 which have their anodes coupled to the ends of the secondary winding of a first transformer 31. One of the demodulated sideband signals shown as the upper sideband signal is applied to the primary winding of the first transformer 31. The cathodes of the diodes 30 are connected together through a load resistor 32. The secondary winding of a second transformer 33 is connected between a center tap on the secondary winding of the first transformer 31 and a center tap on the load resistor 32. The other demodulated sideband signal or lower sideband signal is applied to the primary winding of the second transformer 33. The circuit shown in Figure 2 is known in the art, and is similar to a conventional phase comparator, sometimes called phase detector. A direct current control voltage is produced across the load resistor 32 by the phase comparator 19, this control voltage having a polarity and magnitude which varies from some normal value as the relative phases of the upper and lower sideband signals varies from the normal value of 90°. This direct current control voltage is applied to the reactance tube 22 associated with the oscillator 18 for varying the frequency of the oscillator 18 up or down as the relative phases of the upper and lower sideband signals vary up or down from 90°.

Figure 3 shows a radio receiver in accordance with a second embodiment of the invention. The operation of the receiver shown in Figure 3 is similar to the operation of the receiver shown in Figure 1. The receiver of Figure 3 can be used where the carrier level is much higher than the sideband level at demodulators 16, 17. Audio signals are derived by combining the outputs of the upper and lower sideband demodulators 16, 17 which are positioned between the respective upper and lower sideband filters 14 and 15 and the phase comparator 19. Two phase shifter circuits 35, 36 for providing the requisite 90° phase shift between the upper and lower sideband signals are positioned between the oscillator 18 and the respective upper and lower sideband demodulators 16, 17. However, if desired, these phase shifters could be positioned between the upper and lower sideband demodulators 16, 17 and the phase comparator 19. As long as the requisite phase shifts are provided for the phase comparator 19, it does not matter where the phase shifters are inserted in the circuit.

As will be appreciated, if a phase comparator circuit is used that can produce a control voltage in accordance with the relative phase varying about some normal phase difference other than 90°, then the phase shifters shown in Figures 1 and 3 must be adjusted accordingly. If a phase comparator is used which can detect phase changes from a normal phase difference of zero, then no phase shifters are needed.

Instead of using upper and lower sideband filters, the sidebands can be separated by double balanced two phase modulators or by any other known means. As understood in the art, the input signal and carrier are applied to a pair of balanced modulators in a phase relationship such that one of the sidebands is eliminated in the output of the modulators. Means may be provided for recovering the eliminated sideband so as to provide the two separated sidebands from one double balanced two phase modulator or a second double balanced two phase modulator may be used to recover the other sideband. The principles discussed are applicable to amplitude modulation systems using unsymmetrical sideband distributions; vestigial sidebands, and so on. In such systems, control is obtained by limiting the control band to the symmetrical portion of the sidebands.

The invention provides a receiving system for use in double sideband suppressed carrier systems, and particularly a system by which a carrier of the precise frequency and phase required is supplied at the receiver. The invention provides for the more satisfactory use of suppressed carrier methods, whereby the increased gain and other advantages over normal double sideband transmission can be obtained.

What is claimed is:

1. In combination, an input circuit to which a double sideband signal can be applied, means connected to said circuit to separate said signal into upper sideband signals and lower sideband signals, an oscillator arranged to produce a signal having a frequency equal to the mean frequency of said separated upper and lower sideband signals, demodulating means coupled to said separating means and to said oscillator for individually demodulating said upper and lower sideband signals, means including a phase comparator coupled to said demodulating means and arranged to compare the phases of said demodulated upper and lower sideband signals and to produce a control signal according to the relative phases of said demodulated sideband signals, and means connected to said oscillator and to said phase comparing means to cause said oscillator to be operated in response to said control signal, said oscillator being operated to cause a fixed phase and frequency relationship to be maintained between said sideband signals and the signal produced by said oscillator.

2. A system for receiving radio frequency signals characterized by amplitude modulated double sideband signals and a suppressed carrier comprising, in combination, an input circuit to which a double sideband suppressed carrier signal is applied, means connected to said circuit to separate said signal into upper sideband and lower sideband signals, a signal generating means arranged to produce a signal having a frequency equal to the mean frequency of said separated upper and lower sideband signals, demodulating means coupled to said separating means and to said generating means for individually demodulating said upper and lower sideband signals, means including a phase comparator coupled to said demodulating means and arranged to compare the phase of said demodulated upper and lower sideband signals and to produce a control signal having a magnitude and a polarity indicative of the relative phases of said demodulated sideband signals, and control means connected to said generating means and to said phase comparing means to cause said generating means to be operated in response to said control signal, said generating means being operated by said control means to cause a fixed phase and frequency relationship to be maintained between said sideband signals and the signal produced by said generating means.

3. A system as claimed in claim 2 and wherein said control means includes a reactance tube responsive to said control signal and connected to the frequency determining circuit of said generating means.

4. A system as claimed in claim 2 and wherein said separating means includes an upper sideband filter connected to said circuit and arranged to pass only the upper sideband signals, and a lower sideband filter connected to said circuit and arranged to pass only the lower sideband signals.

5. A system for receiving double sideband suppressed carrier signals comprising, in combination, an input circuit to which a double sideband suppressed carrier signal can be applied, means connected to said circuit to separate said signal into upper sideband and lower sideband signals, an oscillator arranged to produce a signal having a frequency equal to the mean frequency of said separated upper and lower sideband signals, demodulating means coupled to said separating means and to said oscillator for individually demodulating said upper and lower sidebands signals, a phase comparator arranged to produce a control signal according to any change from a given phase difference between signals applied thereto, phase shifting means connected to said demodulating means and arranged to normally produce said given phase difference between said demodulated sideband signals, means to apply said demodulated sideband signals from said phase shifting means to said phase comparator, said phase comparator being operated to produce said control signal according to a variation in the relative phases of said demodulated sideband signals from said given phase difference, and means connected to said oscillator and to said phase comparing means to cause said oscillator to be operated in response to said control signal, said oscillator being operated to cause a fixed phase and frequency relationship to be maintained between said sideband signals and the signal produced by said oscillator.

6. A system as claimed in claim 5 and wherein said phase comparator is arranged to produce said control signal according to a change from a phase difference of 90° between said demodulated sideband signals.

7. A system for receiving double sideband suppressed carrier signals comprising, in combination, an input circuit to which a double sideband suppressed carrier signal can be applied, means connected to said circuit to separate said signal into upper sideband and lower sideband signals, an oscillator arranged to produce a signal having a frequency equal to the mean frequency of said separated upper and lower sideband signals, a phase comparator arranged to produce a control signal according to any change from a given phase difference between signals applied thereto, demodulating means connected to said separating means, phase shifting means connected to said oscillator and to said demodulating means and arranged to apply a first and second output signal of said mean frequency and having said given phase difference to said demodulating means, said demodulating means being responsive to said separated upper and lower sideband signals and to said output signals to produce demodulated upper and lower sideband signals normally having said given phase difference, means to connect said phase comparator to said demodulating means, said phase comparator operating to produce said control signal according to a change in the relative phases of said demodulated sideband signals from said given phase difference, and means to operate said oscillator in response to said control signal to cause a fixed phase and frequency relationship to be maintained between said sideband signals and the signal produced by said ocsillator.

8. A system as claimed in claim 7 and wherein said phase comparator is arranged to produce said control signal having a magnitude and polarity according to a change in the relative phases of said demodulated sideband signals from a phase difference of 90°.

9. In combination, an input circuit to which a double sideband signal can be applied, frequency selective filtering means connected to said circuit to separate said signal into upper sideband signals and lower sideband signals, an oscillator arranged to produce a signal having a frequency equal to the mean frequency of said separated upper and lower sideband signals, demodulating means connected to said filtering means and to said oscillator for individually demodulating said upper and lower sideband signals, means including a phase comparator and phase shifting means coupled to said demodulating means and arranged to compare the phases of said demodulated upper and lower sideband signals and to produce a control signal according to a change in the relative phases of said demodulated sideband signals from a given phase difference, control means connected to said oscillator and to said phase comparing means to cause said oscillator to be operated in response to said control signal, said oscillator being operated to cause a fixed phase and frequency relationship to be maintained at all times between said sideband signals and the signal produced by said oscillator, and an output demodulator connected to said oscillator and to said circuit to convert the double sideband signal to an audio frequency output signal.

10. A combination as claimed in claim 9 and wherein said filtering means includes an upper sideband filter connected to said circuit and arranged to pass only the upper sideband signals, and a lower sideband filter connected to said circuit and arranged to pass only the lower sideband signals, said control means including a reactance tube responsive to said control signal and connected to the frequency determining circuit of said oscillator.

11. A system for receiving double sideband suppressed carrier signals comprising, in combination, an input circuit to which a double sideband suppressed carrier signal can be applied, frequency selective filter means connected to said circuit to separate said signal into upper sideband and lower sideband signals, an oscillator arranged to produce a signal having a frequency equal to the mean frequency of said separated upper and lower sideband signals, demodulating means connected to said filter means and to said oscillator for individually demodulating said upper and lower sideband signals, a phase comparator arranged to produce a control signal according to any change from a phase difference of 90° between signals applied thereto, phase shifting means connected to said demodulating means and arranged to normally produce said phase difference of 90° between said demodulated sideband signals, means to apply said demodulated sideband signals from said phase shifting means to said phase comparator, said phase comparator being operated to produce said control signal according to a variation in the relative phases of said demodulated sideband signals from said phase difference of 90°, means connected to said oscillator and to said phase comparing means to cause said oscillator to be operated in response to said control signal, said oscillator being operated to cause a fixed phase and frequency relationship to be maintained between said sideband signals and the signal produced by said oscillator, and an output demodulator coupled to said oscillator and to said input circuit to convert said received double sideband suppressed carrier signal to an audio frequency output signal.

12. A system as claimed in claim 11 and wherein a phase corrector is connected between said oscillator and said output demodulator to compensate for phase shift due to the operation of said filter means.

13. A system for receiving double sideband suppressed carrier signals comprising, in combination, frequency selective means for separating a double sideband suppressed carrier signal into upper sideband signals and lower sideband signals, an upper sideband demodulator, a lower sideband demodulator, means coupling said demodulators to said frequency selective means so that the upper sideband signals are applied to said upper sideband demodulator and so that the lower sideband signals are applied to said lower sideband demodulator, an oscillator arranged to produce a signal of a frequency equal to the mean frequency of said separated upper and lower sideband signals, a phase comparator arranged to produce a control signal according to any change from a given phase difference between signals applied thereto, phase shifting means connected to said oscillator and to said demodulators and arranged to apply a first output signal to said upper sideband demodulator and a second output signal to said lower sideband demodulator, the output signals of said phase shifting means being of said mean frequency and having said given phase difference, said demodulators being responsive to said upper and lower sideband signals and to said output signals to produce demodulated upper and lower sideband signals normally having said given phase difference, means to connect said phase comparator to said demodulators, said phase comparator operating to produce said control signal according to a change in the relative phase of said demodulated sideband signals from said given phase difference, and control means to operate said oscillator in response to said control signal to cause a fixed phase and frequency relationship to be maintained between said sideband signals and the signal produced by said oscillator, whereby an audio frequency signal may be produced in response to a received double sideband suppressed carrier signal by combining the output signals of said demodulators.

14. A system as claimed in claim 13 and wherein said control means includes a reactance tube responsive to said control signal and connected to the frequency determining circuit of said oscillator.

15. A system as claimed in claim 13 and wherein said phase comparator includes first and second unidirectional current conducting devices each having an anode and cathode, said anodes being connected together through the secondary winding of a first transformer having a primary winding to which one of said demodulated sideband signals is applied, said cathodes being connected together through a load resistor, a second transformer having a primary winding to which said other demodulated sideband signals is applied and a secondary winding connected between a tap on said resistor and a tap on the secondary winding of said first transformer.

16. A combination as claimed in claim 1, and in addition means coupled to said input circuit for receiving a radio frequency double sideband signal and for converting said last-mentioned signal to an intermediate frequency double sideband signal, whereby the double sideband signal applied to said input circuit is an intermediate frequency double sideband signal.

No references cited.